(12) United States Patent
Uchiyama et al.

(10) Patent No.: US 6,339,530 B1
(45) Date of Patent: *Jan. 15, 2002

(54) ATTACHMENT STRUCTURE FOR ATTACHING A DISPLAY DEVICE TO AND REDUCING AN EXTERNAL SIZE OF A HOUSING OF EQUIPMENT IN WHICH THE ATTACHMENT STRUCTURE IS PROVIDED

(75) Inventors: Yoshiharu Uchiyama; Mikio Kurihara; Hiroyuki Noguchi, all of Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/627,556

(22) Filed: Jul. 28, 2000

Related U.S. Application Data (62) Division of application No. 09/022,908, filed on Feb. 12, 1998, now Pat. No. 6,128,183.

(30) Foreign Application Priority Data

May 9, 1997 (JP) ............................................. 9-119510

(51) Int. Cl.[7] ................................................. G06F 1/16
(52) U.S. Cl. .......................... 361/681; 345/87; 345/905; 312/223.2; 248/919
(58) Field of Search ............................... 361/681, 682; 345/169, 905; 312/223.1–223.6; 248/917–924

(56) References Cited

U.S. PATENT DOCUMENTS 5,640,296 A * 6/1997 Bonsall et al. .............. 361/681
6,061,231 A * 5/2000 Crockett ..................... 361/681
6,064,565 A * 5/2000 Ishihara et al. ............. 361/681
6,128,183 A * 10/2000 Uchiyama et al. .......... 361/681

FOREIGN PATENT DOCUMENTS

| JP | 4-55083 | 5/1992 |
| JP | 6-21018 | 3/1994 |
| JP | 8-5998 | 1/1996 |
| JP | 8-190085 | 7/1996 |
| JP | 8-327983 | 12/1996 |
| JP | 9-114391 | 5/1997 |

* cited by examiner

*Primary Examiner*—Leo P. Picard
*Assistant Examiner*—Hung Van Duong
(74) *Attorney, Agent, or Firm*—Scully, Scott, Murphy & Presser; Marian Underweiser, Esq.

(57) ABSTRACT

The present invention provides an attachment structure of a display device which enables the outer dimensions to be reduced while maintaining the display area and makes assembling simple. More specifically, the present invention is directed to an attachment structure for a display device for attaching a display device comprising a display part 102 of a shape of a rectangular plate and a frame part 104 arranged in the outer periphery thereof to an external casing 200 having a rectangular opening part 204 formed of a side wall, in which an aperture 106 is formed in at least one of two opposing edges of the frame 104 in the direction parallel to the plane of the display part 102 and the external casing 200 is provided with a pin 218 which is engageable with said aperture 106 and is or is not moveable in the direction parallel to the plane of the display part 102.

6 Claims, 8 Drawing Sheets

ATTACHMENT STRUCTURE FOR ATTACHING A DISPLAY DEVICE TO AND REDUCING AN EXTERNAL SIZE OF A HOUSING OF EQUIPMENT IN WHICH THE ATTACHMENT STRUCTURE IS PROVIDED

CROSS REFERENCE TO RELATED APPLICATION

The present application is a divisional of application Ser. No. 09/022,908 filed Feb. 12, 1998 now U.S. Pat. No. 6,128,183 dated Oct. 3, 2000.

BACKGROUND OF THE INVENTION

1. Technical Field

This invention relates to an attachment structure of a display device and an equipment in which such structure is provided. More particularly, the invention is directed to an attachment structure for attaching a display device such as a liquid crystal panel in a small portable electronic equipment to the housing of such equipment and reducing the size thereof, and an equipment in which such structure is provided.

2. Prior Art

As a result of increased demand for small portable electronic equipment and the improvement in performance of such equipment in recent years, reduction of the external dimensions of such equipment along with the increase of the amount of display information or the display area have been demanded. Such demand is remarkable, particularly in small portable electronic equipment using a liquid crystal panel as a display device, including a so-called notebook personal computer.

Figure 10:
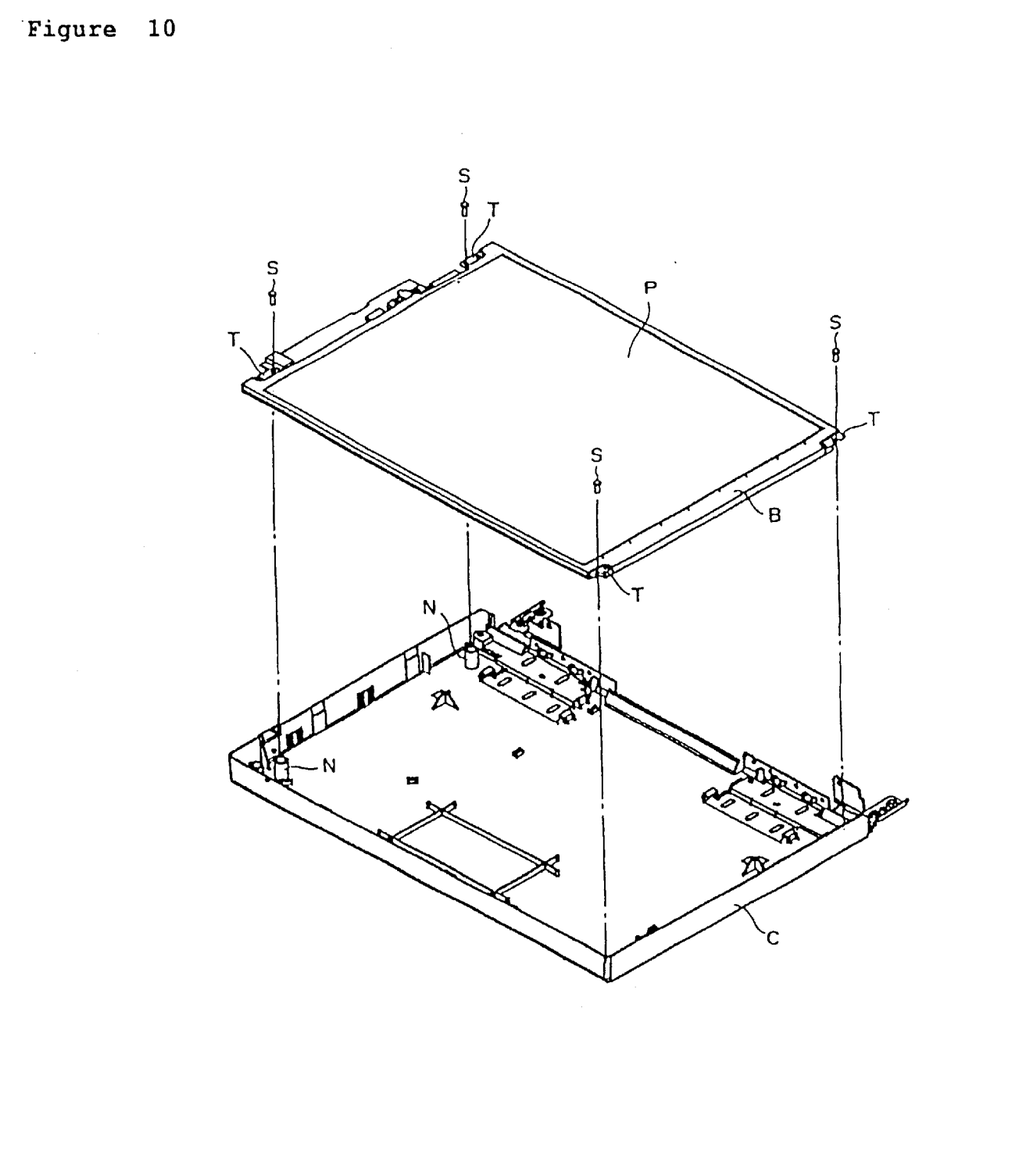
FIG. 10 is a perspective view of an attachment structure of a prior art in a disassembled form.

In such a notebook personal computer in the prior art, a liquid crystal panel used to be attached to the external casing by having a tab or a flange T extrude in parallel to the plane of the liquid crystal panel near the 4 corners of the periphery of a bezel B which comprises an outer frame of a rectangular shaped liquid crystal panel and tightening the tab T with a screw S against the fixing nut N located on the inner bottom of the external casing C in the direction orthogonal to the plane of the liquid crystal panel P.

In such a prior art attachment structure, however, because the tab T was tightened against the fixing nut N located on the inner bottom of the external casing C with the screw S from the direction orthogonal to the plane of the liquid crystal panel P, there was a problem in which a gap corresponding to the diameter of the screw head was required between the outer periphery of the bezel B and the inner periphery of the external casing C so that the gap remained as a dead space. This space was a problem because it contributed only to enlargement of the outer dimensions of the external casing regardless of the increase of the display area of the liquid crystal panel P.

SUMMARY OF THE INVENTION

It is an object of this invention to provide an attachment structure for a display device which allows the external dimension to be smaller while maintaining the display area by reducing such dead space and enables a simple assembly, and an equipment in which such structure is provided.

BRIEF DESCRIPTION OF THE DRAWINGS

Preferred embodiments of the present invention will now be described by way of example only, with reference to the accompanying drawings, in which.

DETAILED DESCRIPTION OF THE PREFERRED EMBODIMENTS OF THE INVENTION

One aspect of this invention to achieve such objective is an attachment structure for a display device for attaching a display device which comprises a display part of a shape of a rectangular plate and a frame part arranged in the outer periphery thereof to an external casing having a rectangular opening part formed of a side wall, in which an aperture is formed in at least one of two opposing edges of the frame in the direction parallel to the plane of the display part and the external casing is provided with a pin which is engageable with the aperture.

Another aspect of this invention is an attachment structure for a display device for attaching a display device which comprises a display part of a shape of a rectangular plate and a frame part arranged in the outer periphery thereof to an external casing having a rectangular opening part formed of a side wall, in which an aperture is formed in at least one of two opposing edges of the frame in the direction parallel to the plane of the display part and the external casing is provided with a pin which is actuated in the direction parallel to the plane of the display part and engageable with the aperture.

The pin may be provided up right on the second edge of L shaped resilient member the first edge of which is fixed on the bottom wall of the external casing, the second edge being parallel to the side wall.

The pin may be supported by a supporting member fixed on the side wall of the external casing so as to be movable in the direction parallel to the plane of the display part and is activated by a spring which is interposed between the side wall and the pin.

It is also preferable that a guide slope is formed in at least either one of the frame and the pin for retracting the pin when the display device is inserted into the opening part.

It is further preferable that a taper is formed in the direction of insertion in at least either one of the aperture and the pin.

Because an aperture is formed in the direction parallel to the plane of the display part in at least one of two opposing edges of the frame arranged on the periphery of the display part of a shape of rectangular plate while a pin which is engageable with the aperture is provided on the external casing according to one aspect of this invention, the other edge of the frame may be fixed by an arbitrary means after engaging the pin with the aperture in the one edge with the display device tilted when it is inserted into the opening of the external casing. As a result, only a small gap is required between at least one of two opposing edges of the frame and the side wall of the external casing so that the outer dimension of the external casing is reduced by decreasing dead space correspondingly.

Because an aperture is formed in the direction parallel to the plane of the display part in at least one of two opposing edges of the frame arranged on the periphery of the display part of a shape of rectangular plate while a pin which is actuated so as to be movable in the direction parallel to the plane of the display part and engageable with the aperture on the external casing is provided according to another aspect of this invention, the other edge of the frame may be fixed by an arbitrary means after engaging the pin with the aperture in the one edge while retracting the pin when the display device is inserted into the opening of the external casing. As a result, only a sufficiently small gap to allow retraction of the pin is required between at least one of two opposing edges of the frame and the side wall of the external casing so that the outer dimension of the external casing is reduced by decreasing the dead space correspondingly. Further, assembling may be simply worked out for instance by automation because the display device need not be necessarily tilted.

A preferred embodiment of this invention will now be described in detail with reference to the attached drawings. Each embodiment is disclosed for the purpose of describing the invention and is in no way intended to limit the invention. For example, a feature illustrated or described as a part of an embodiment may be used in another embodiment so as to produce a further embodiment. Incidentally, a same reference number is used for a same functional part throughout the description and the drawings.

Figure 1:
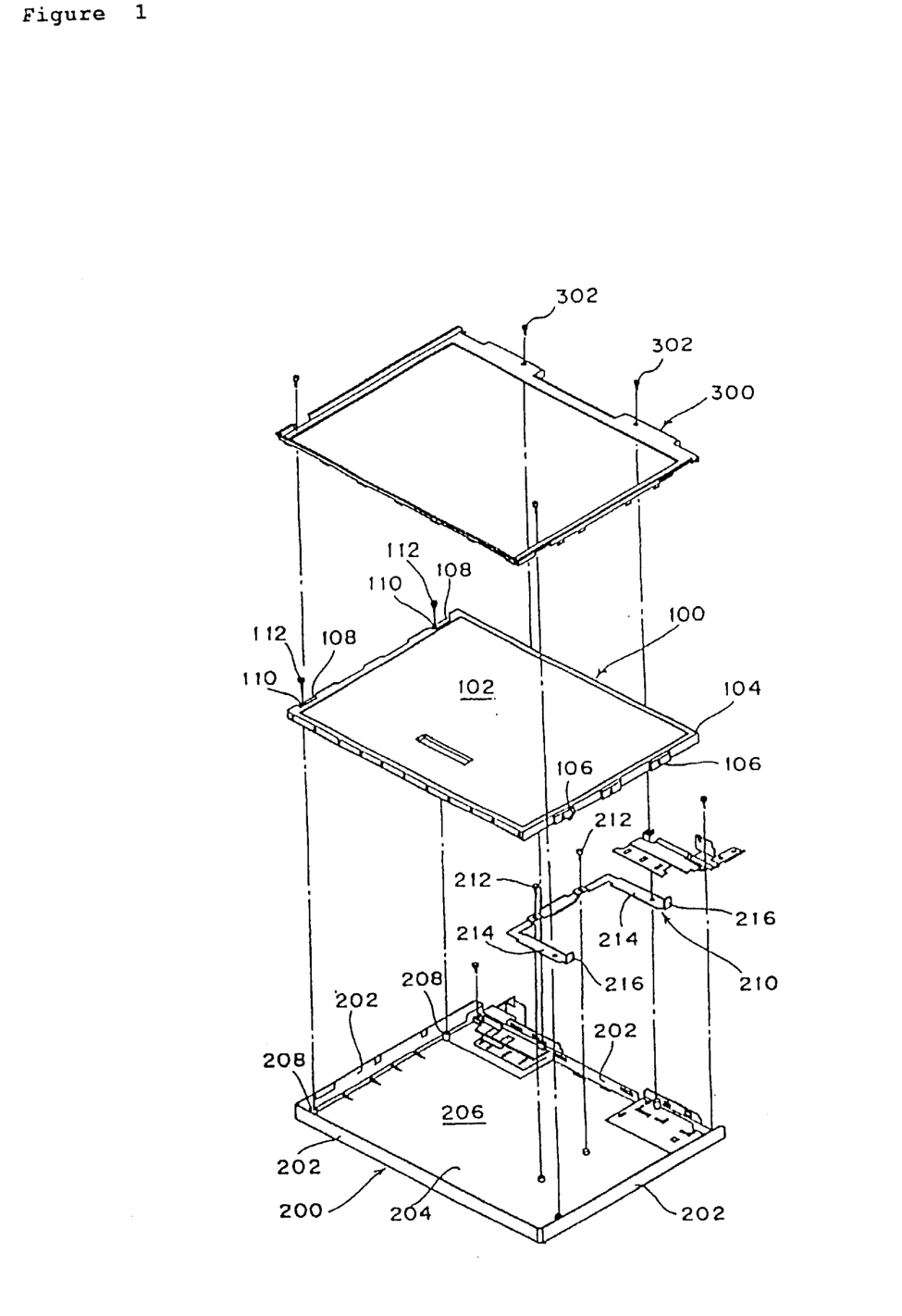
FIG. 1 is a perspective view of an embodiment of this invention in a disassembled form.

In FIG. 1, a perspective view of a disassembled cover part of a so called notebook personal computer is shown as an example of an equipment to which this invention is applied. The cover part essentially comprises a liquid crystal panel 102 which is a display part of a shape of a rectangular plate, a liquid crystal module 100 provided with a bezel 104 which is a frame arranged in the periphery of the panel, a rear cover 200 which is a portion of an external casing to which the liquid crystal module 100 is attached and a front bezel 300 which is also a portion of the external casing attached to the outer periphery of the liquid crystal module 100. The front bezel 300 is overlaid on the periphery of the liquid crystal module 100 and attached to the rear cover 200 with a screw 302 after the liquid after the liquid crystal module 100 is attached to the rear cover 200 as described later.

In this mode of the embodiment, two apertures 106 are formed on one of two opposing edges of the bezel 104, which is a frame of the liquid crystal module 100 in the direction parallel to the plane of the liquid crystal panel 102, while in the other of the edges, there are formed a tab 108 protruding in the direction parallel to the plane of the liquid crystal panel 102 as well as two apertures 110 in the direction orthogonal to the plane of liquid crystal panel 102 similarly to the prior art structure.

Figure 2:
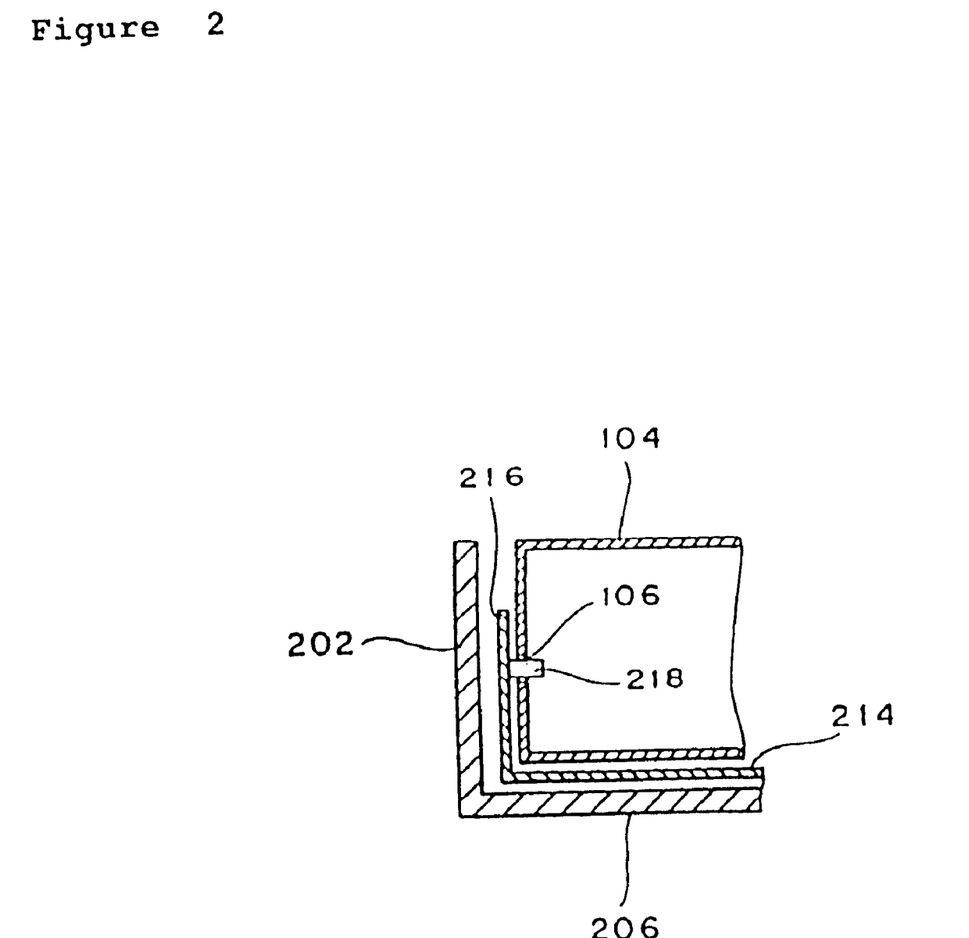
FIG. 2 is an enlarged cross sectional view of a portion of an embodiment of the attachment structure of this invention.

The rear cover 200 has a rectangular opening 204, which is defined by 4 side walls 202 thereof. Two fixing nuts 208 are fixedly attached to the bottom wall 206 at a positions corresponding to the above described aperture 110. A bracket 210 having a planar view substantially in L shape is fixedly attached to the bottom wall of the rear cover 200 with a screw 212 with the end of the arms bent in right angle into L shape. That is, defining the portion of the arm fixed to the bottom wall 206 of the rear cover 200 as being the first edge 214, the second edge 216 which is in right angle thereto is positioned in parallel to the side wall 202. A pin 218 (hidden in FIG. 1, refer to FIG. 2) which is engageable with the aperture 106 is provided up right on the second edge 216 of the bracket 210 which includes the L shaped portion of the member.

When the pin 218 need not move in the direction parallel to the plane of the liquid crystal panel 102, the pin 218 may be either provided directly inside the side wall 202 of the rear cover 200 or the bracket 210 including the L shaped portion of the member may be made of a material of high rigidity.

Figure 3:
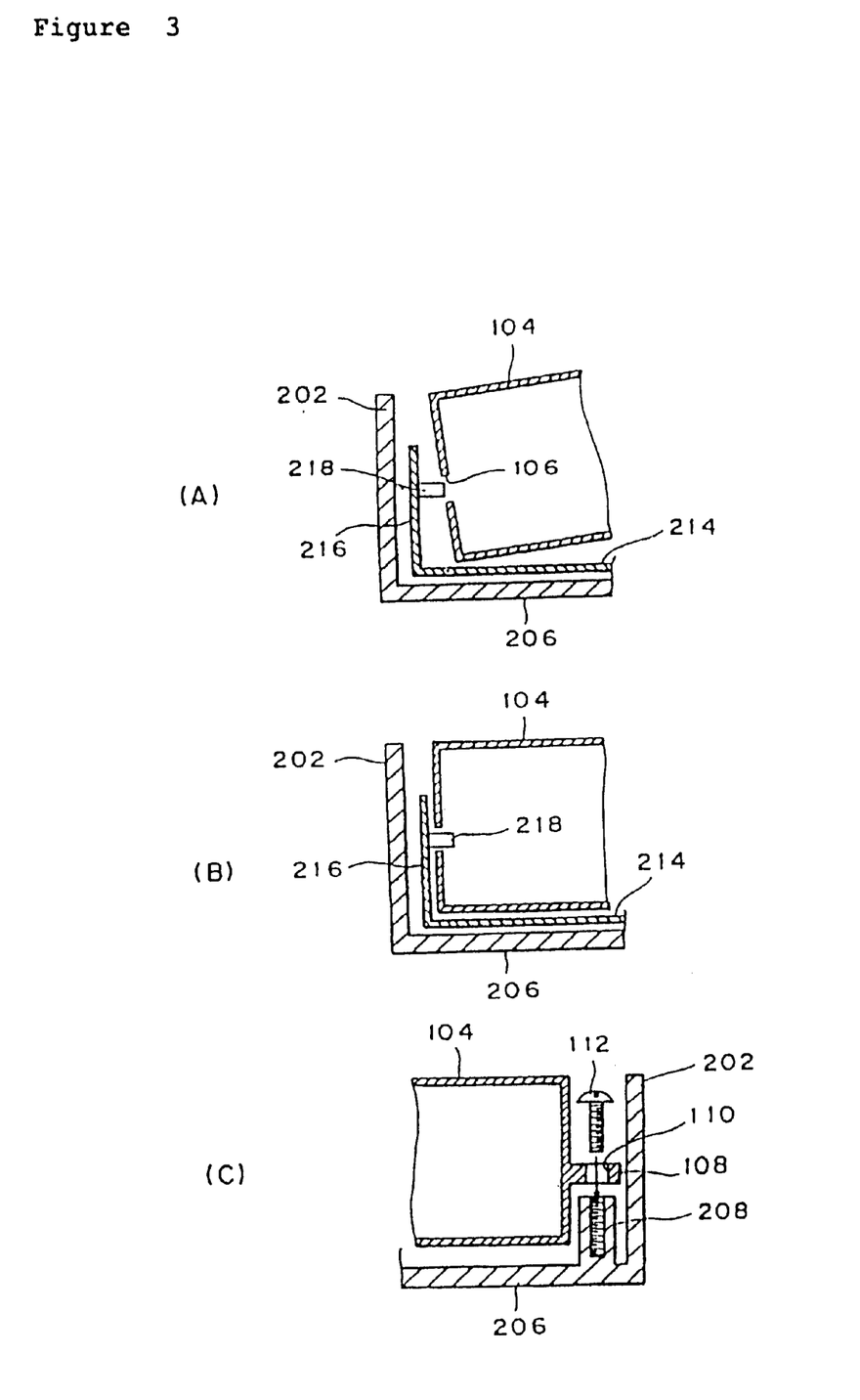
FIG. 3 is a cross sectional view to illustrate the attachment procedure of an embodiment of the attachment structure of this invention.

In attaching the liquid crystal module 100 to the rear cover 200 in the mode of practicing this invention comprising the above structure, the liquid crystal module 100 is fixedly attached to the rear cover 200 by engaging the pin 218 with the aperture 106 (FIG. 3(B)) while tilting the liquid crystal module 100 so that the edge having the aperture 106 formed therein comes downside as shown in FIG. 3(A) and then inserting the screw 112 in the aperture 110 and tightening the tab 108 on the other edge of the liquid crystal module 100 against the fixing nut 208. As a result, only a small gap is needed between one of two opposing edges of the bezel 104 of the liquid crystal module 100 and the side wall 202 of the rear cover 200 so that the outer dimension of the rear cover 200 may be reduced by the reduction of the dead space.

Another mode of implementing this invention will be next described. The difference between this mode and the above described mode lies in that the bracket 210 comprising the L shaped portion of the member of the same structure is made of a resilient material such as stainless steel and the pin 218 is movable in the direction parallel to the plane of the liquid crystal panel 102 (strictly saying, substantially parallel because the second edge 216 in right angle to the first edge 214 is bent actually, the first edge 214 being the portion of the arm which is fixed to the bottom wall 206 of the rear cover 200).

Figure 4:
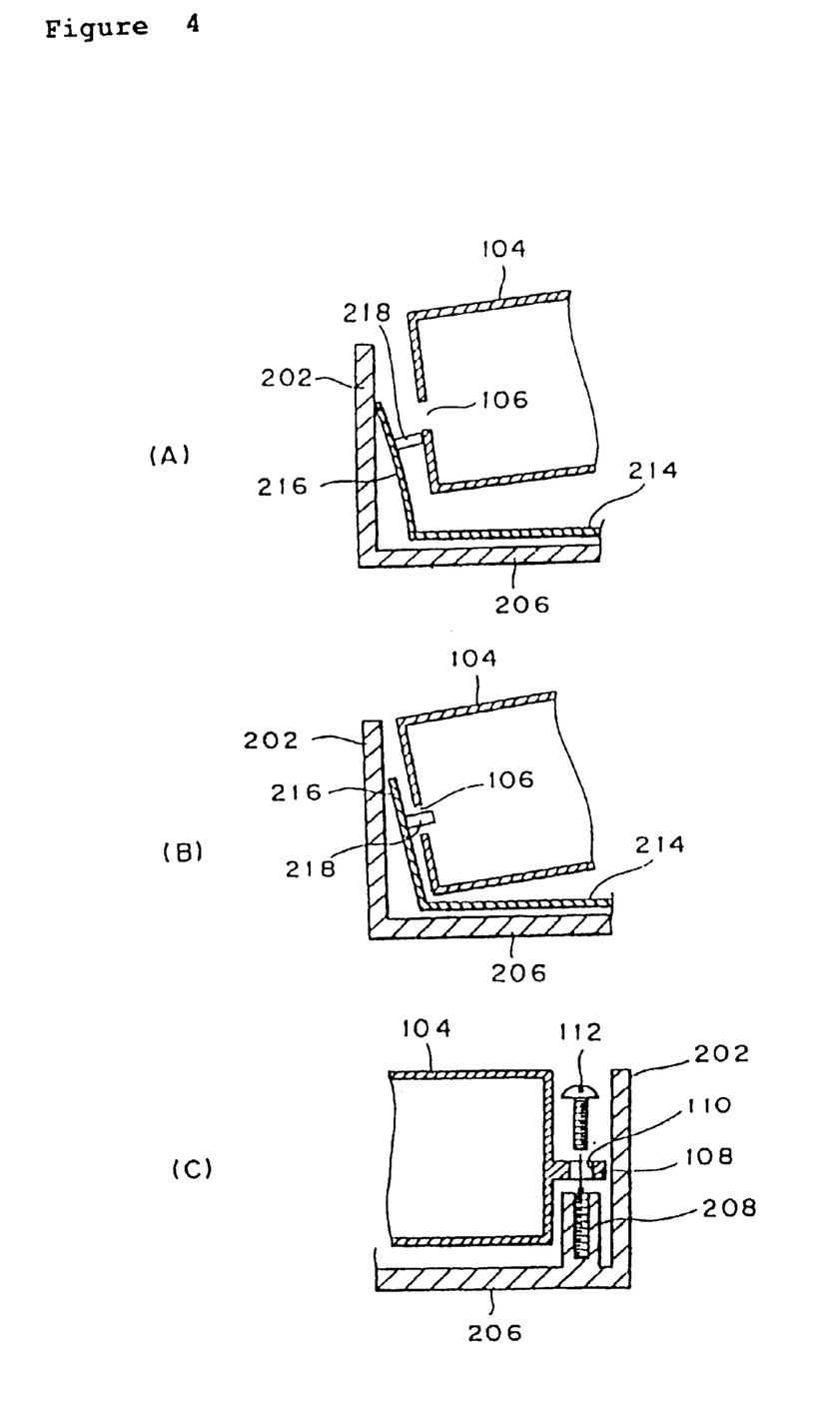
FIG. 4 is a cross sectional view to illustrate the attachment procedure of another embodiment of the attachment structure of this invention.

In attaching the liquid crystal module 100 to the rear cover 200 in the mode of practicing this invention comprising the above structure, the liquid crystal module 100 may be tilted so that the edge having the aperture 106 formed in the liquid crystal module 100 comes downside as shown in FIG. 4(A) but this is not necessarily required and, instead, the liquid crystal module 100 is fixed to the rear cover 200 by inserting the liquid crystal module 100 into the opening part 204 of the rear cover 200 while retracting the pin 218 and engage the pin 218 with the aperture 106 (FIG. 4(B)) and then, like the preceding mode of practice, inserting the screw 112 in the aperture 110 of the tab 108 on the other edge of the liquid crystal module 100 and tightening it to the fixing nut 208. As a result, like the preceding mode of practice, only a small gap is needed between one of two opposing edges of the bezel 104 of the liquid crystal module 100 and the side wall 202 of the rear cover 200 so that the outer dimension of the rear cover 200 may be reduced by the reduction of the dead space.

Figure 5:
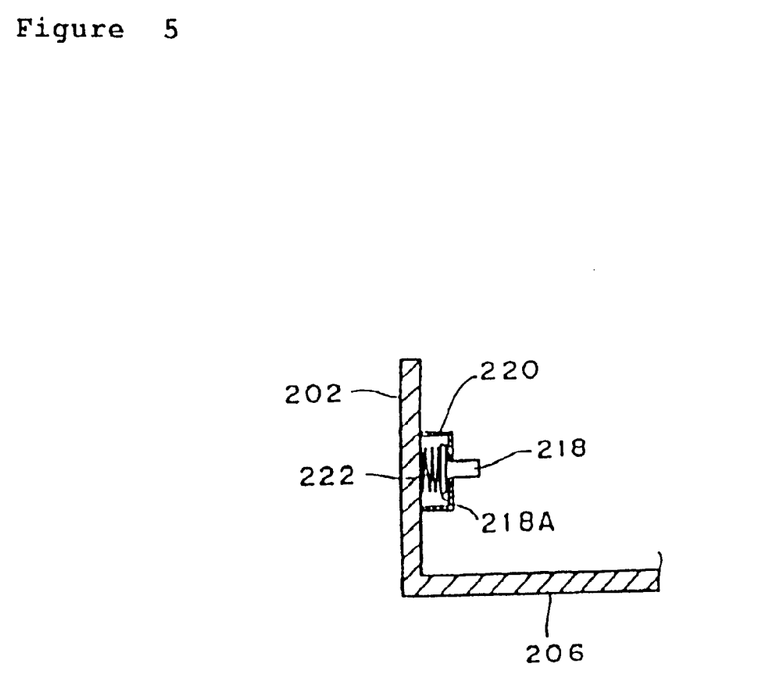
FIG. 5 is a cross sectional view of another embodiment of the attachment structure of this invention.

Incidentally, as a structure to make the pin 218 moveable in the direction parallel to the plane of the liquid crystal panel 102, a pin 218 having a stopper 218A at the rear end may be movably supported in the direction parallel to the plane of the liquid crystal panel 102 by a bracket 220 which is a supporting member fixedly provided on the side wall 202 of the rear cover 200 as shown in FIG. 5 so that it is actuated by a spring 222 which is interposed between the side wall 202 and the stopper 218A of the pin 218.

Figure 6:
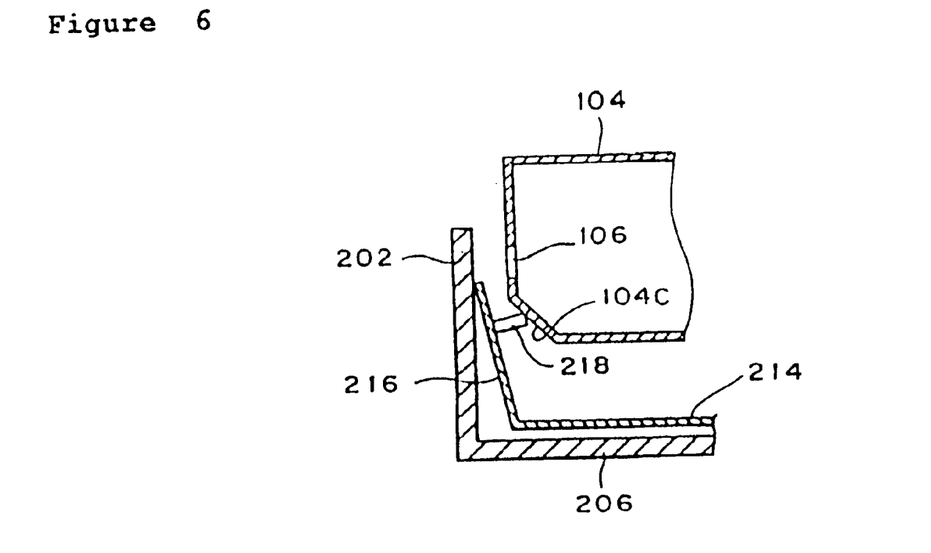
FIG. 6 is a cross sectional view of another embodiment of the attachment structure of this invention.
Figure 7:
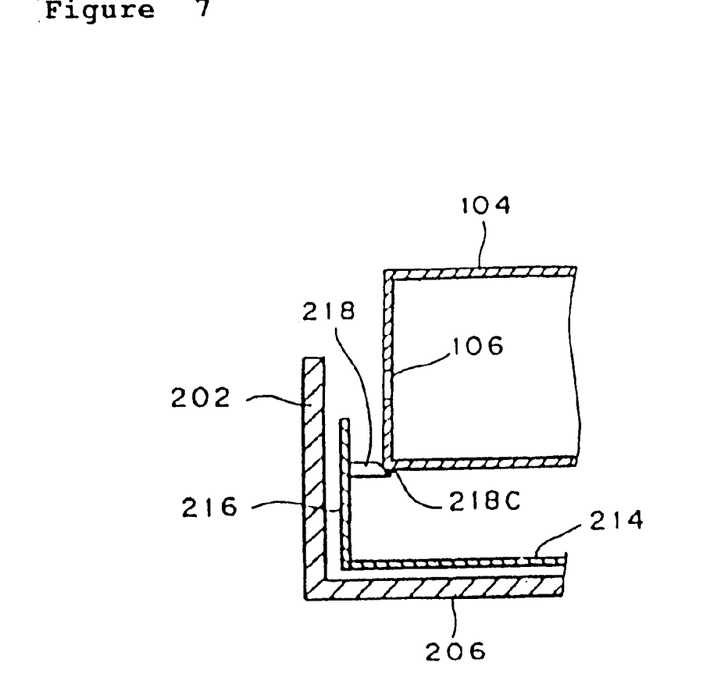
FIG. 7 is a cross sectional view of a still further embodiment of the attachment structure of this invention.

As a further preferred mode of implementing this invention, either one of the bezel 104 and the pin 218 may be formed with a guide slope for retracting the pin 218 when the liquid crystal module 100 is inserted into the opening part 204 as shown in FIGS. 6 and 7. In the mode of embodiment shown in FIG. 6, a guide slope 104C is formed along the lower edge of the bezel 104 while, in the mode shown in FIG. 7, the guide slope 218C is formed at the tip of the pin 218. Both of them may be formed in combination.

By forming the guide slope 104C or 218C in this way, the liquid crystal module 100 may be simply inserted because the pin 218 is subject to a force component which makes it retracted after the pin 218 contacts the guide slope 104C or 218C even when the liquid crystal module 100 is inserted without being tilted in inserting it to the opening part 204.

Figure 8:
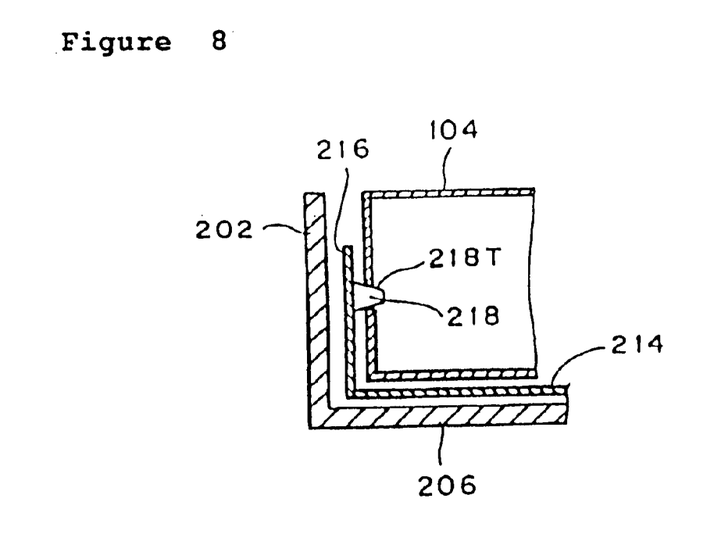
FIG. 8 is a cross sectional view of a still further embodiment of the attachment structure of this invention.
Figure 9:
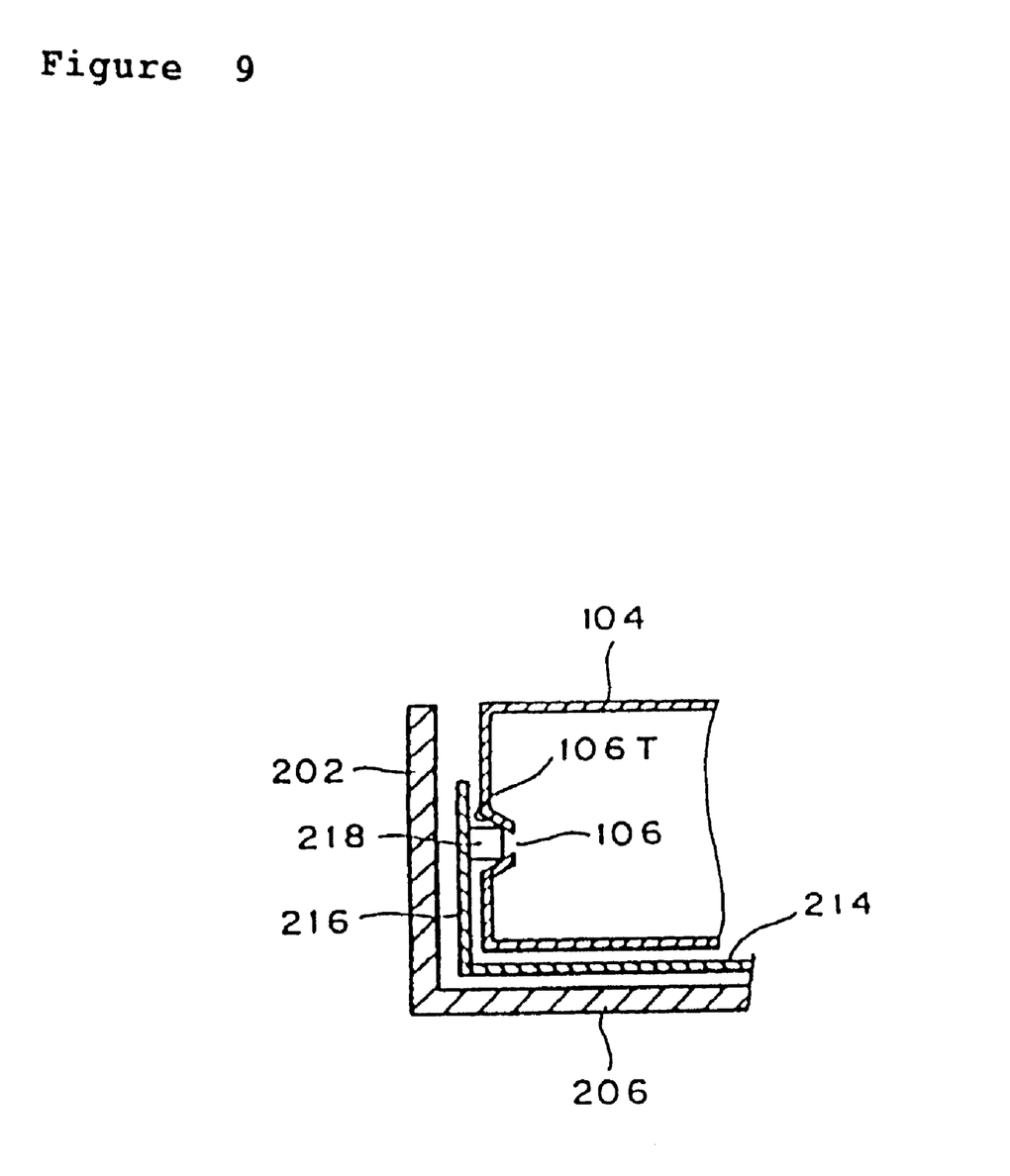
FIG. 9 is a cross sectional view of a still further embodiment of the attachment structure of this invention.

As a further preferred mode of practicing this invention, either one of the aperture of the bezel 104 and the pin 218 may be formed with a taper thinning toward the direction of insertion of the pin 218 as shown in FIGS. 8 and 9. In the mode of practice shown in FIG. 8, the pin 218 is formed with a taper 218T thinning toward the tip of the pin while, in the mode shown in FIG. 9, the aperture 106 is formed with a taper 106T thinning in the direction of insertion of the pin 218.

By forming the taper 218T or 106T in this way, the pin 218 easily engages with the aperture 106 in inserting the liquid crystal module into the opening part 204 and any loose engagement is removed because the pin 218 is resiliently actuated after engagement resulting in a rigid attachment.

While an exemplary arrangement has been described in the above where an aperture 106 is formed in one of the two opposing edges of the bezel 104 of the liquid crystal module 100 while the pin 218 is provided on the rear cover 200 in corresponding relationship to the aperture 106, the outer dimension of the external casing is further reduced by employing such arrangement in the two opposing edges of the liquid crystal module 100. In this case, however, the pin 218 is limited to a moveable mode.

In the modes shown in the figures, with the thickness of the second edge 216 and the bezel 104 being 0.3 mm, respectively and with the protrusion of the pin 218 from the second edge 216 being 0.7 mm long, it was possible to make the gap between the back of the second edge 216 and the side wall 202 of the rear cover 200 to be in the order of 0.7 mm, taking the retraction of the pin 218 into consideration. As a result, it was possible to make the gap between the outer periphery of the bezel 104 and the side wall 202 of the rear cover 200 to be less than 2 mm.

In the prior art, the gap between the outer periphery of the bezel 104 and the side wall 202 of the rear cover 200 had to be at least larger than the diameter of the screw head (e.g., 4 mm or 5.5 mm) so that a gap of more than about 5 mm was required in one side and about 10 mm for both sides while the outer dimension was reduced by about 3 mm for one side and as much as 6 mm for both sides according to the above embodiment.

It is a big improvement that the outer dimension can be reduced by about 6 mm in a notebook personal computer to which this invention is applied.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. An attachment structure for a display device for attaching a display device which comprises a display part of a shape of a rectangular plate and a frame part arranged in the outer periphery thereof to an external casing having a rectangular opening part formed of a side wall, in which an aperture is formed in at least one of two opposing edges of the frame in the direction parallel to the plane of the display part; and, a pin supported by a supporting member fixed on the side wall of said external casing so as to be movable in the direction parallel to the plane of said display part and is activated by a spring which is interposed between said side wall and the pin for actuation in the direction parallel to the plane of said display part and engageable with said aperture.

2. The attachment structure for a display device according to claim 1, in which a guide slope is formed in at least either one of said frame part and said pin for retracting the pin when said display device is inserted into said opening part.

3. The attachment structure for a display device according to claim 1 in which a taper is formed in the direction of insertion of said pin in at least either one of said aperture and said pin.

4. A notebook personal computer which is provided with the attachment structure for a display device in accordance with claim 1.

5. The attachment structure for a display device according to claim 2 in which a taper is formed in the direction of insertion of said pin in at least either one of said aperture and said pin.

6. A notebook personal computer comprising:

a liquid crystal panel comprising a display part in the shape of a rectangular plate;

a frame about a periphery of said liquid crystal panel for attachment to a rear cover portion of an external casing having a rectangular opening part formed of a side wall, in which an aperture is formed in at least one of two opposing edges of the frame in the direction parallel to the plane of the display part; and, a pin supported by a supporting member fixed on the side wall of said external casing so as to be movable in the direction parallel to the plane of said display part and is activated by a spring which is interposed between said side wall and the pin for actuation in the direction parallel to the plane of said display part and engageable with said aperture.

* * * * *